United States Patent
Cho

(10) Patent No.: US 9,706,487 B2
(45) Date of Patent: Jul. 11, 2017

(54) WIRELESS NETWORK DEVICE AND AUTOMATIC CONFIGURATION METHOD FOR LINKING WIRELESS LOCAL AREA NETWORK

(71) Applicant: VIVOTEK INC., New Taipei (TW)

(72) Inventor: Chin-Wei Cho, New Taipei (TW)

(73) Assignee: VIVOTEK INC., New Taipei (TW)

( * ) Notice: Subject to any disclaimer, the term of this patent is extended or adjusted under 35 U.S.C. 154(b) by 220 days.

(21) Appl. No.: 14/587,698

(22) Filed: Dec. 31, 2014

(65) Prior Publication Data
US 2015/0237666 A1 Aug. 20, 2015

(30) Foreign Application Priority Data

Feb. 14, 2014 (TW) .............................. 103104962 A

(51) Int. Cl.
*G06F 15/173* (2006.01)
*H04W 48/20* (2009.01)
*H04W 48/18* (2009.01)
*H04W 84/12* (2009.01)

(52) U.S. Cl.
CPC ........... *H04W 48/20* (2013.01); *H04W 48/18* (2013.01); *H04W 84/12* (2013.01)

(58) Field of Classification Search
CPC ..... H04W 4/001; H04W 4/005; H04W 8/005; H04W 36/08; H04W 48/14; H04W 88/08; H04W 12/06; H04W 48/18; H04W 48/20; H04L 67/125; G06F 15/177
USPC ............... 370/215, 328, 338, 315, 404, 254; 455/517
See application file for complete search history.

(56) References Cited

U.S. PATENT DOCUMENTS

| | | | |
|---|---|---|---|
| 2008/0013558 A1* | 1/2008 | Ito ...................... | H04W 36/08 370/404 |
| 2008/0175187 A1* | 7/2008 | Lowry ................ | H04L 67/125 370/328 |
| 2008/0198823 A1* | 8/2008 | Shiu ................... | H04W 48/20 370/338 |
| 2009/0080390 A1* | 3/2009 | Zhou .................. | H04W 48/18 370/338 |
| 2013/0039352 A1* | 2/2013 | Ruster ................ | H04W 88/08 370/338 |
| 2013/0081113 A1* | 3/2013 | Cherian .............. | G06F 15/177 726/4 |
| 2013/0094441 A1* | 4/2013 | Milner ................ | H04W 4/001 370/328 |

(Continued)

*Primary Examiner* — Dustin Nguyen
(74) *Attorney, Agent, or Firm* — Maschoff Brennan

(57) ABSTRACT

A wireless network device and an automatic configuration method are provided. When no second wireless network device providing a wireless local area network (WLAN) is found or when a service identifier of the second wireless network device lacks a preset prefix, a first wireless network device operates in an access point (AP) mode with service identifier comprising the preset prefix to receive a first setting signal carrying a terminal service identifier of a network terminal device, switches its operation mode from the AP mode to a client mode to edit its service identifier setting by the terminal service identifier, and connects to the network terminal device. When the service identifier of the second wireless network device comprises the preset prefix, the first wireless network device connects to the second wireless network device to link the network terminal device.

14 Claims, 6 Drawing Sheets

(56) References Cited

U.S. PATENT DOCUMENTS

| | | | | |
|---|---|---|---|---|
| 2013/0100855 A1* | 4/2013 | Jung | .................... | H04W 12/06 |
| | | | | 370/254 |
| 2013/0115993 A1* | 5/2013 | Jain | .................... | H04W 4/005 |
| | | | | 455/517 |
| 2013/0315132 A1* | 11/2013 | Hou | .................... | H04B 7/155 |
| | | | | 370/315 |
| 2014/0064260 A1* | 3/2014 | Mastenbrook | ........ | H04W 8/005 |
| | | | | 370/338 |
| 2015/0139025 A1* | 5/2015 | Lee | .................... | H04W 76/021 |
| | | | | 370/254 |
| 2015/0245282 A1* | 8/2015 | Kim | .................... | H04W 48/14 |
| | | | | 370/338 |

* cited by examiner

WIRELESS NETWORK DEVICE AND AUTOMATIC CONFIGURATION METHOD FOR LINKING WIRELESS LOCAL AREA NETWORK

CROSS-REFERENCE TO RELATED APPLICATIONS

This non-provisional application claims priority under 35 U.S.C. §119(a) on Patent Application No(s). 103104962 filed in Taiwan, R.O.C. on Feb. 14, 2014, the entire contents of which are hereby incorporated by reference.

TECHNICAL FIELD

The disclosure relates to a wireless network device and an automatic configuration method for linking a wireless local area network (WLAN), more particularly to a wireless network device which is capable of automatically switching the operation mode and an automatic configuration method for linking multiple wireless network devices to a WLAN.

BACKGROUND

Since wireless network is popularized and widely applied day by day, more and more houses and offices are installed with multiple wireless network devices. For example, multiple wireless network devices (e.g. IP cameras) are configured in some unsafe places in a commercial building to simultaneously surveil these places. Images captured by these IP cameras are shown by a displayer (e.g. a monitor) so that guards can simultaneously monitor these places.

However, setting these wireless network devices is not easy. For instance, in the past, setting wireless network devices was carried out by editing the service identifier (e.g. Service Set Identifier, SSID) of the wireless network device after a user wiredly or wirelessly accesses the setting interface of the wireless network device via a computing device (e.g. a computer). After the service identifier of the wireless network device is edited, the wireless network device links to a network terminal device (e.g. a wireless router or a wireless access point (AP)) according to the edited service identifier. If the user needs to set many wireless network devices, the above process to set a wireless network device has to be repeated many times manually.

SUMMARY

According to one or more embodiments, the disclosure provides an automatic configuration method for linking a wireless local area network (WLAN), and the automatic configuration method is applied to set a first wireless network device. In one embodiment, the automatic configuration method includes the following steps. Search for at least a second wireless network device providing a WLAN exists. When the at least one second wireless network device is not found or when a service identifier of the at least one second wireless network device does not comprise a preset prefix, set the first wireless network device in an access point (AP) mode. A service identifier of the first wireless network device comprises the preset prefix, or when only one of the at least one second wireless network device whose service identifier comprises the preset prefix, establish connection with the second wireless network device having the preset prefix. Receive a first setting signal comprising a terminal service identifier. When the at least one second wireless network device is not found or when the service identifier of the at least one second wireless network device does not comprise the preset prefix, set the first wireless network device in a client mode. Edit the service identifier setting of the first wireless network device by the terminal service identifier.

According to one or more embodiments, the disclosure provides a wireless network device. In one embodiment, the wireless network device includes a processing unit and a storage unit. The storage unit is electrically connected to the processing unit and stores software instructions. The processing unit performs the above automatic configuration method according to the software instructions.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
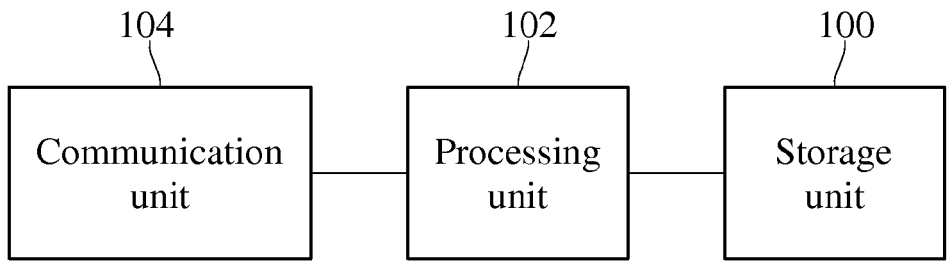
FIG. 1 is functional block diagram of a wireless network device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is functional block diagram of a wireless network device according to an embodiment of the disclosure. A wireless network device 10 (referred to as the first wireless network device) includes a processing unit 102 and a storage unit 100. The storage unit 100 is electrically connected to the processing unit 102. For instance, the wireless network device 10 can be a wireless IP camera, a video server, a network video recorder (NVR), or any possible device capable of linking to a WLAN, but the disclosure will not be limited thereto.

The storage unit 100 stores software instructions for the operation of the processing unit 102. For example, the storage unit 100 can be a non-volatile memory such as a programmable read-only memory (PROM), an erasable programmable read-only memory (EPROM), an electrically erasable programmable read-only memory (EEPROM), or a flash memory, but the disclosure will not be limited thereto.

The processing unit 102 performs the software instructions stored in the storage unit 100 to perform an automatic configuration method for linking a WLAN in the disclosure. The automatic configuration method will be described in detail later. For instance, the processing unit 102 can be a microprocessor, a central process unit (CPU), or other possible components capable of computing data, but the disclosure will not be limited thereto.

Furthermore, the wireless network device 10 includes a communication unit 104. The communication unit 104 is electrically connected to the processing unit 102 and searches for available wireless network device(s) providing a WLAN. The searching manner can be, for example, the site survey of IEEE 802.11, and the searching target can be, for example, access points (APs).

Figure 2:
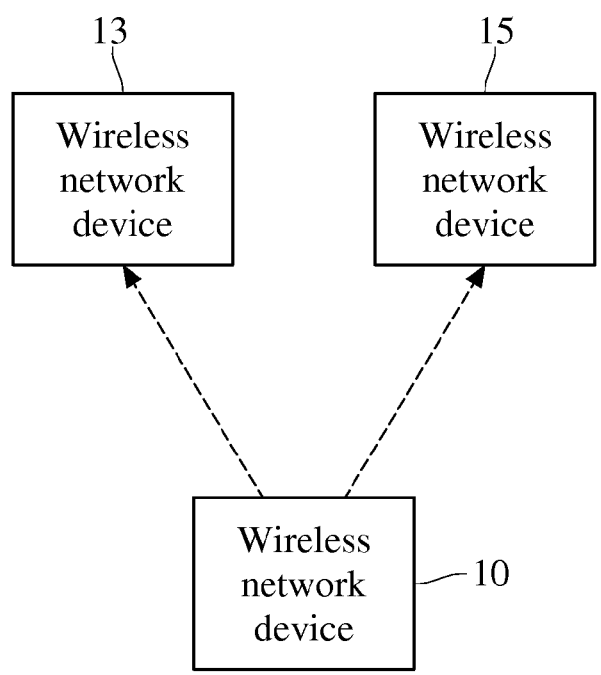
FIG. 2 is a schematic diagram of automatically configuring WLAN link according to an embodiment of the disclosure.

In an exemplary embodiment, the detail of configuring WLAN link is described as follows by referring to FIG. 1 and FIG. 2. FIG. 2 is a schematic diagram of automatically configuring WLAN link according to an embodiment of the disclosure. First, the processing unit 102 searches for any other wireless network device via the communication unit 104. When the communication unit 104 determines that no wireless network device is found or that all found wireless network devices whose service identifier lacks a preset prefix, the processing unit 102 sets the wireless network device 10 to operate in an access point (AP) mode with a service identifier includes the preset prefix. For example, the service identifier of the wireless network device 10 is a service set identifier (SSID) of IEEE 802.11. Alternately, when the service identifier of only one found wireless network devices includes the preset prefix, the wireless network device 10 connects to this wireless network device whose service identifier includes the preset prefix.

For example, if the wireless network device 10 can not find out any wireless network device or if the wireless network device 10 finds out two wireless network devices 13 and 15 whose service identifier lacks the preset prefix (e.g. the service identifier does not start from the word string "ACCESS NETWORK"), the processing unit 102 in the wireless network device 10 sets the operation mode of the wireless network device 10 to be the AP mode. The wireless network device 10 in the AP mode uses its service identifier to establish a WLAN such that other wireless network devices can link the wireless network device 10. The service identifier of the wireless network device 10 includes such a prefix. Alternately, if the service identifier of one (e.g. the wireless network device 13) of the wireless network devices 13 and 15 found includes such a prefix, the wireless network device 10 operates in the client mode to establish the connection between the wireless network device 10 and that wireless network device (e.g. the wireless network device 13).

Figure 3A:
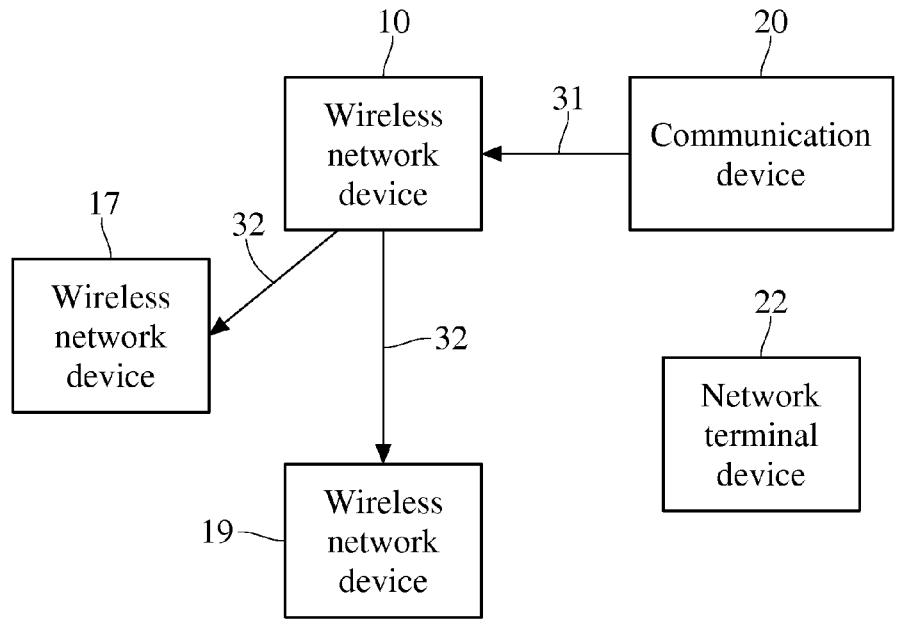
FIG. 3A is a schematic diagram of automatically configuring WLAN link according to an embodiment of the disclosure.
Figure 3B:
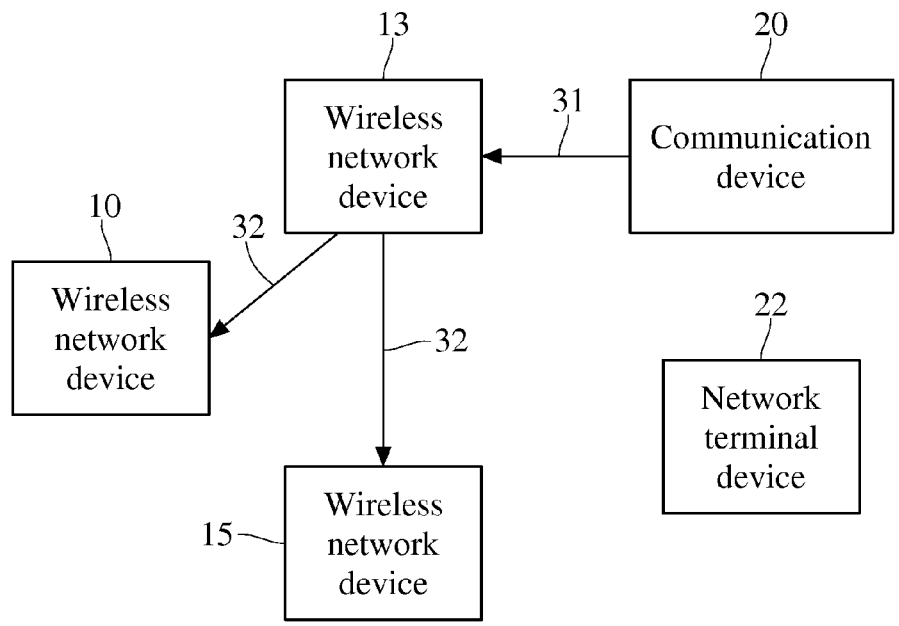
FIG. 3B a schematic diagram of automatically configuring WLAN link according to an embodiment of the disclosure.

The detail of configuring WLAN link is described as follows by referring to FIGS. 1, 2, 3A and 3B. FIG. 3A is a schematic diagram of automatically configuring WLAN link according to an embodiment of the disclosure, and FIG. 3B a schematic diagram of automatically configuring WLAN link according to an embodiment of the disclosure. By changing the wireless network setting of the wireless network device 10, the wireless network device 10 can connect to a network terminal device 22 (e.g. a wireless router or a wireless access point (AP)) as shown in FIG. 3A. When the wireless network device 10 operates in the AP mode, a user can use a communication device 20 (e.g. a smart phone) to transmit a first setting signal 31 to the wireless network device 10. In response to the first setting signal 31 the wireless network device 10 sends a second setting signal 32 to one or more other wireless network devices, e.g. a wireless network device 17 and a wireless network device 19, connecting to the wireless network device 10. Alternately, as shown in FIG. 3B, after the wireless network device 10 connects to the wireless network device 13 whose service identifier includes the preset prefix, the wireless network device 13 receives the first setting signal 31 from the communication device 20 and send the second setting signal 32 to the wireless network device 10 in response to the first setting signal 31.

The first setting signal 31 includes, for example, a terminal service identifier of the network terminal device 22 such as a SSID of the network terminal device 22. The first setting signal 31 can also include an encryption scheme and an encryption key of the network terminal device 22. For example, the encryption scheme is wired equivalent privacy (WEP), Wi-Fi protected access (WPA), WPA2, but the disclosure will not be limited to. Through a user interface provided by an app installed in the communication device 20, the information carried by the first setting signal 31 can be manually set, be automatically obtained in site survey, or be obtained by manually selecting one of multiple results of site survey. The wireless network device 10 can receive the first setting signal 31 via the communication unit 104. In this or some embodiment, the format of the first setting signal 31 and the format of the second setting signal 32 can be absolutely the same, be similar, or be completely different, and the information carried by the first setting signal 31 and the information carried by the second setting signal 32 can be completely the same or be similar.

In this or some embodiments, the wireless network device 10 can send different wireless network devices one by one the second setting signal 32. For example, the second setting signal 32 is sent to the wireless network device 19 after the second setting signal 32 is sent to the wireless network device 17, as shown in FIG. 3A. Alternately, the wireless network device 10 can broadcast the second setting signal 32 to different devices. For example, the second setting signal 32 is simultaneously sent to the wireless network device 17 and the wireless network device 19, as shown in FIG. 3A.

Figure 4A:
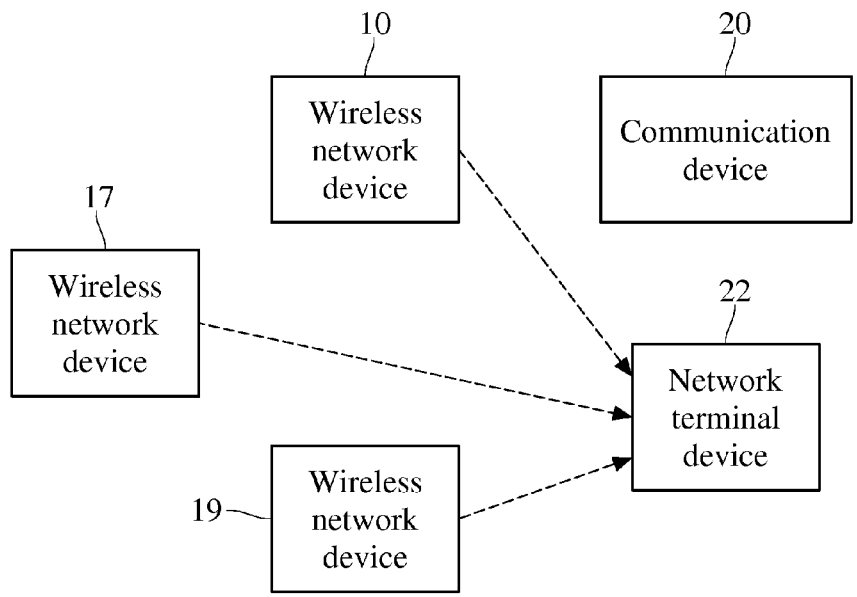
FIG. 4A is a schematic diagram of automatically configuring WLAN link according to an embodiment of the disclosure.

The detail of configuring WLAN link is described as follows by referring to FIGS. 1, 2, 3A and 4A. FIG. 4A is a schematic diagram of automatically configuring WLAN link according to an embodiment of the disclosure. In FIG. 4A, after the wireless network device 17 and the wireless network device 19 receives the second setting signal 32, the wireless network device 17 and the wireless network device 19 edit their service identifier settings by the terminal service identifier in the second setting signal 32, cut off the connection with the wireless network device 10, and try to connect to the network terminal device 22 with the terminal service identifier.

Since the wireless network device 10 operates in the AP mode herein, the processing unit 102 switches the operation mode of the wireless network device 10 from the AP mode to the client mode and edit the service identifier setting of the wireless network device 10 by the terminal service identifier in the first setting signal 31 such that the wireless network device 10 can connect to the network terminal device 22. Particularly, when the communication unit 104 cannot find out any available wireless network device, or when the communication unit 104 finds out one or more wireless network devices whose service identifier lacks the preset prefix, the processing unit 102 switches the operation mode of the wireless network device 10 from the AP mode to the client mode after sending the second setting signal 32. Moreover, after sending the second setting signal 32, the processing unit 102 in the wireless network device 10 edits the service identifier setting of the wireless network device 10 by the terminal service identifier to establish the connection between the wireless network device 10 and the network terminal device 22.

Figure 4B:
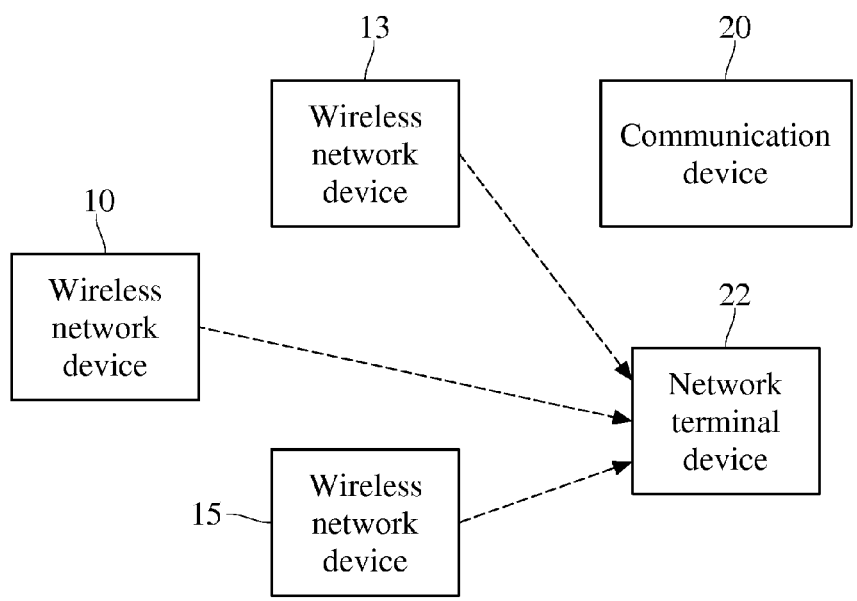
FIG. 4B is a schematic diagram of automatically configuring WLAN link according to an embodiment of the disclosure.

The detail of configuring WLAN link is described as follows by referring to FIGS. 1, 2, 3B and 4B. FIG. 4B is a schematic diagram of automatically configuring WLAN link according to an embodiment of the disclosure. As shown in FIG. 4B, after receiving the second setting signal 32, the wireless network device 10 edits its service identifier setting by the terminal service identifier in the second setting signal 32, cuts off the connection with the wireless network device 13 and tries to establish the connection with network terminal device 22 having the terminal service identifier.

Moreover, the wireless network device 10 switches from the client mode to the AP mode in a first waiting time and switches from the AP mode to the client mode in a second waiting time. In other words, in the duration of searching for any wireless network device providing a WLAN, if no wireless network device is found for a first waiting time, e.g. 30 seconds, or if no wireless network device found whose service identifier includes the preset prefix for the first waiting time, the processing unit 102 will change the operation mode of the wireless network device 10 from the client mode to the AP mode.

In addition, when no other wireless network device connecting or connected to the wireless network device 10 which is in the AP mode for a second waiting time (e.g. 1 minute), the processing unit 102 in the wireless network device 10 will change the operation mode of the wireless network device 10 from the AP mode to the client mode to search for any wireless network device providing a WLAN. In this or some embodiments, the first waiting time and the second waiting time are the same such as 30 seconds, or are different (for example, the first waiting time is 30 seconds as the second waiting time is 1 minute), but the disclosure will not be limited thereto.

In this or some embodiments, the service identifier of the wireless network device which is the target of applying the automatic configuration method for linking a WLAN (e.g. wireless network device 10) further includes a static name and a dynamic value. The static name is related to a media access control (MAC) address, and the dynamic value is related to the number of other wireless network device connected to the device which is the target of applying the automatic configuration method for linking a WLAN (e.g. wireless network device 10). To simplify the description, the following will use the wireless network device 10 as an example of the wireless network device which is the target of applying the automatic configuration method for linking a WLAN. However, the reader should note that other wireless network device (e.g. wireless network device 13, or 15, or 17, or 19) which is the target of applying the automatic configuration method for linking a WLAN also conforms the following. For the wireless network device 10, for example, the MAC address to produce the static name is a MAC address of the wireless network device 10 and is in hexadecimal format containing uppercase letters or lowercase letters or mixed uppercase and lowercase letters, such as 0002D1ABCD68 or 00-02-D1-AB-CD-68, but the disclosure will not be limited thereto. For example, the static name is an octal MAC address of a wireless network device, is the result of computing a MAC address of a wireless network device, is a unique individual serial number indicating a wireless network device.

When the number of wireless network device connected to the wireless network device 10 increases, the processing unit 102 will correspondingly change the dynamic value of the service identifier of the wireless network device 10. For example, the initial dynamic value of the service identifier of the wireless network device 10 in the AP mode is 0. In this case, when another wireless network device connects to the wireless network device 10, the processing unit 102 will add 1 to the dynamic value of the service identifier of the wireless network device 10 or add 2 or other suitable value to the dynamic value of the service identifier of the wireless network device 10. In another case, the initial dynamic value of the service identifier of the wireless network device 10 can be not 0.

Otherwise, when the connection between the wireless network device 10 and one or more other wireless network devices is cut off, the processing unit 102 will decrease or correspondingly modify or maintain the dynamic value of the service identifier of the wireless network device 10, the disclosure will not be limited thereto. As shown in FIG. 3A, when the wireless network device 10 connects to the wireless network devices 17 and 19, the dynamic value of the service identifier of the wireless network device 10 is 2. In this case, when the service identifier of the wireless network device 17 is changed or when the connection between the wireless network device 10 and the wireless network device 17 is cut off, the dynamic value of the service identifier of the wireless network device 10 will still be 2. Or, the dynamic value of the service identifier of the wireless network device 10 will decrease by 1 and become 1 because of the cut-off connection, but the disclosure will not be limited thereto.

Please refer to FIGS. 1 and 2. In an exemplary embodiment, the processing unit 102 determines that the number of found-out wireless network device whose service identifier includes the preset prefix is more than 1 (e.g. the wireless network devices 13 and 15 are found out, and their service identifier includes the preset prefix). If the dynamic value of the service identifier of the wireless network device 13 (referred to as the second wireless network device) is greater than that of the wireless network device 15 (referred to as the fourth wireless network device), the wireless network device 10 will connect to the wireless network device 13. For example, when there are three wireless network devices ever connected to the wireless network device 13, the dynamic value of the service identifier of the wireless network device 13 will be 3, and when there is only one wireless network device ever connected to the wireless network device 15, the dynamic value of the service identifier of the wireless network device 15 will be 1. Herein, when the wireless network device 10 in the client mode finds out the two wireless network devices 13 and 15, the processing unit 102 will know that the dynamic value of the service identifier of the wireless network device 13 is more than that of the wireless network device 15 such that the wireless network device 10 will connect to the wireless network device 13.

In another exemplary embodiment, the initial dynamic value of the service identifier of the wireless network device 10 in the AP mode is 9999 or another suitable value. In this case, when there is an extra wireless network device connected to the wireless network device 10, the processing unit 102 will decrease the dynamic value of the service identifier of the wireless network device 10 by 1. Or, the processing unit 102 will reduce the dynamic value of the service identifier of the wireless network device 10 by 2 or another suitable value. Besides, when the connection between the wireless network device 10 and one or more wireless network devices is cut off, the processing unit 102 will increase, correspondingly modify, or maintain the dynamic value of the service identifier of the wireless network device 10, but the disclosure will not be limited thereto.

Moreover, when the processing unit 102 found more than one wireless network device, e.g. the wireless network devices 13 and 15, whose service identifier includes the preset prefix, and the dynamic value of the service identifier of the wireless network device 13 is smaller than that of the wireless network device 15, the wireless network device 10 will connect to the wireless network device 13. For instance, if there are 3 wireless network devices ever connected to the wireless network device 13, the dynamic value of the service identifier of the wireless network device 13 will become 9996, and if there is only one wireless network device ever connected to the wireless network device 15, the dynamic value of the service identifier of the wireless network device 15 will become 9998. In this case, when the wireless network device 10 in the client mode finds out the two wireless network devices 13 and 15, since the processing unit 102 knows that the dynamic value of the service identifier of the wireless network device 13 is smaller than that of the wireless network device 15, the wireless network device 10 will connect to the wireless network device 13.

When the dynamic value of the service identifier of the wireless network device 13 is equal to that of the wireless network device 15, the processing unit 102 will compare the static name of the service identifier of the wireless network device 13 with that of the wireless network device 15 to establish the connection between the wireless network device 10 and the wireless network device 13 or 15. For example, the number of wireless network device ever connected to the wireless network device 13 and the number of wireless network device ever connected to the wireless network device 15 are 3, so the dynamic values of the service identifiers of the wireless network devices 13 and 15 are 3. In this case, since the dynamic values of the service identifiers of the wireless network devices 13 and 15 are the same, the processing unit 102 further compares the static name of the service identifier of the wireless network device 13 with that of the wireless network device 15. The wireless network device 10 connects to the wireless network device with a smaller static name represented by ASCII. For instance, the static name of the wireless network device 13 is 00-05-5D-E8-0F-A3, and the static name of the wireless network device 15 is 00-05-5D-E8-0F-B5. The static name of the wireless network device 13 has 17 characters. Since the ASCII of the sixteenth character "A" in the static name of the wireless network device 13 is smaller than that of the sixteenth character "B" in the static name of the wireless network device 15, the wireless network device 10 will connect to the wireless network device 13.

Or, the wireless network device 10 can connect to the wireless network device with a greater static name represented by ASCII. For example, the ASCII of the sixteenth character "B" in the static name of the wireless network device 15 is greater than that of the sixteenth character "A" in the static name of the wireless network device 13, and the wireless network device 10 will connect to the wireless network device 15. Or, the comparison of the static names of the wireless network devices is performed based on other manners such that the processing unit 102 can determine which wireless network device to be connected, but the disclosure will not be limited thereto.

Moreover, in this embodiment or some embodiments, after the wireless network device 10 in the client mode successfully connects to another wireless network device that operates in the AP mode and has a service identifier matching the aforementioned determination and before the wireless network device 10 receives the second setting signal 32, the wireless network device 10 will regularly or irregularly repeat the above searching task and the above determination of searching results. Once a wireless network device having more suitable service identifier is found in the wireless network device 10, the wireless network device 10 will connect to the wireless network device having more suitable service identifier.

Figure 5A:
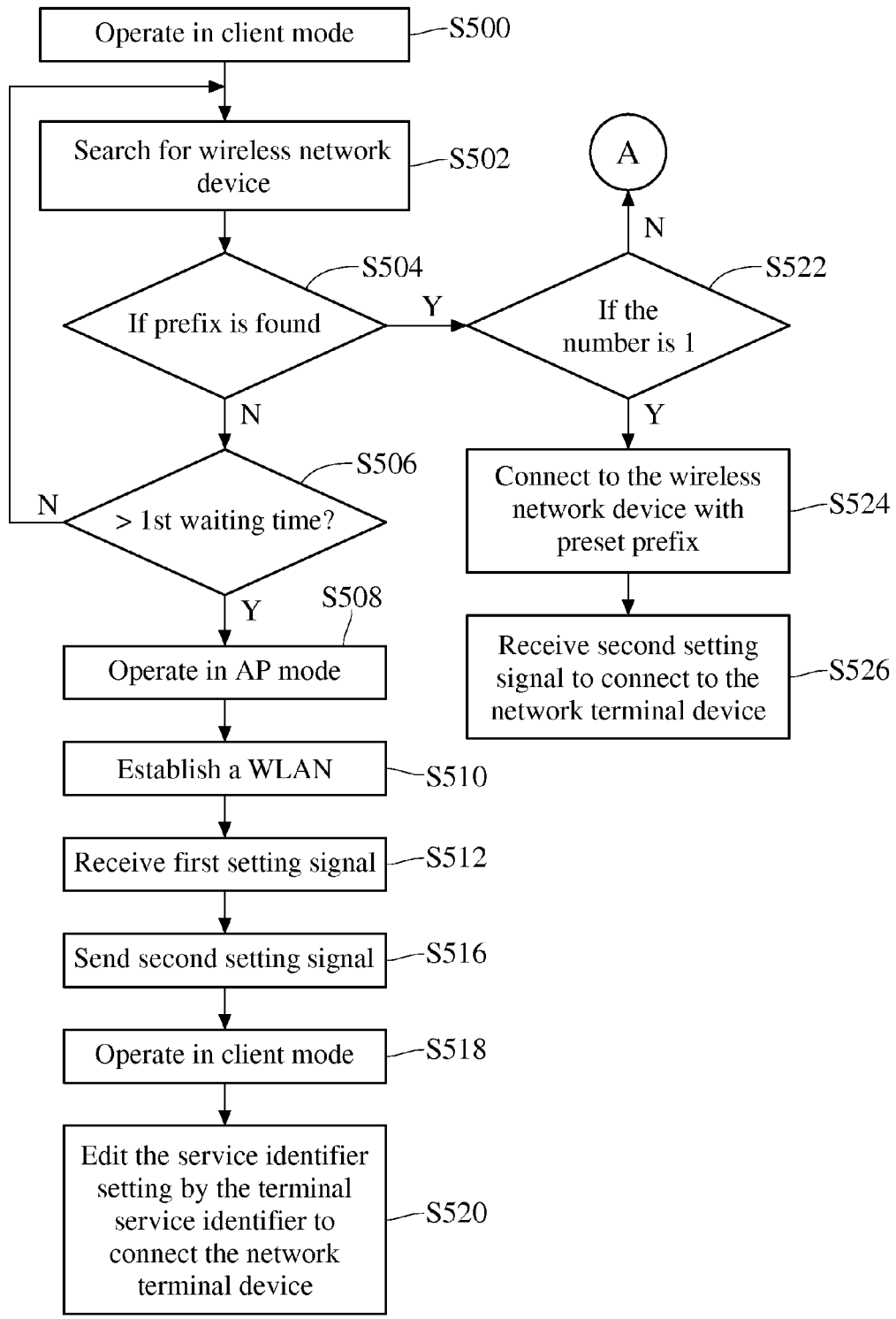
FIG. 5A to FIG. 5C illustrate a flow chart of an automatic configuration method for linking a WLAN according to an embodiment of the disclosure.
Figure 5B:
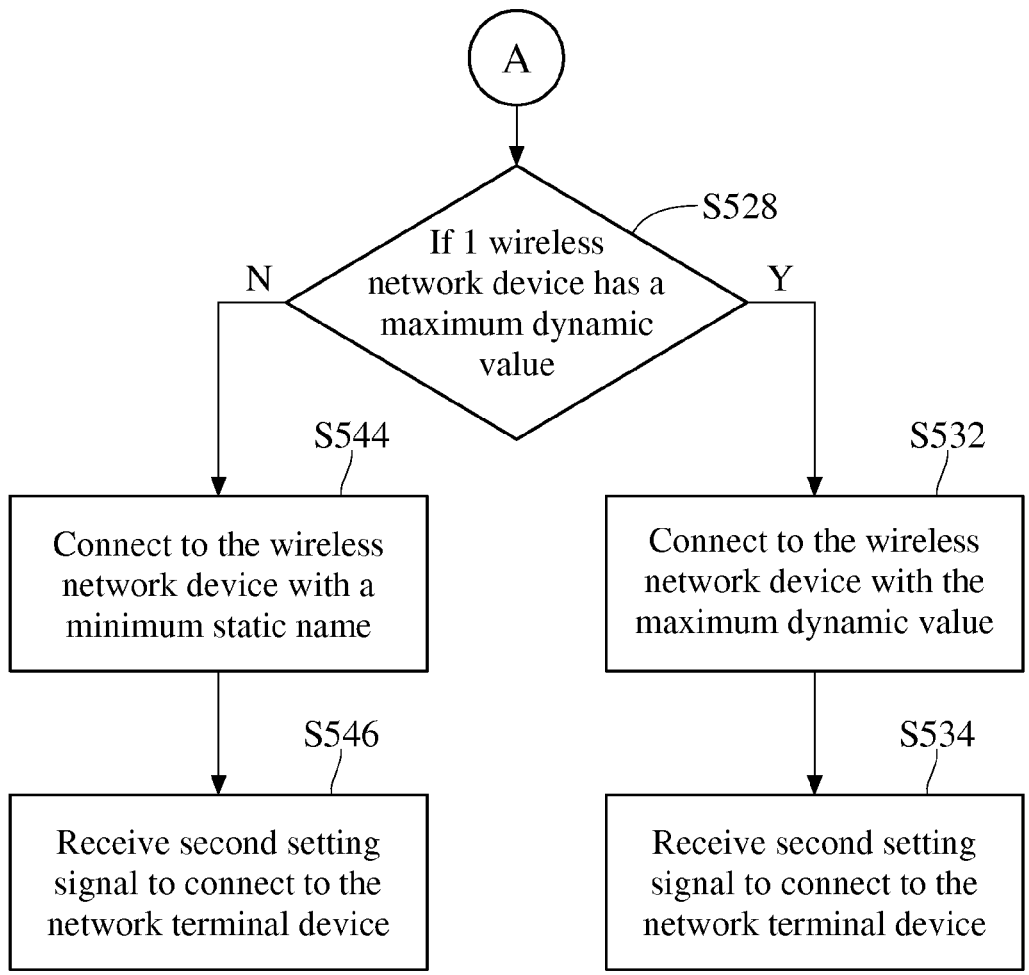
Figure 5C:
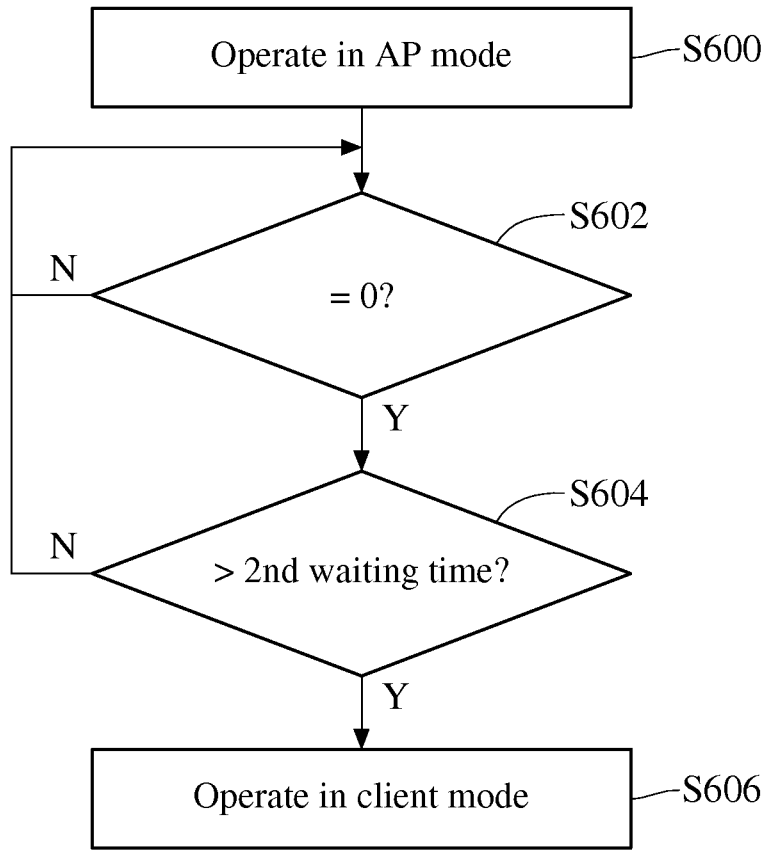

To clearly describe the operation of the automatic WLAN linking device in the disclosure, the automatic configuration method is illustrated as follows by referring to FIGS. 2 to 5C. FIGS. 5A to 5C illustrate a flow chart of an automatic configuration method according to an embodiment of the disclosure. The automatic configuration method is applied to set the wireless network device 10. As shown in step S500 in FIG. 5A, the wireless network device 10 operates in the client mode. In step S502, the wireless network device 10 searches for any wireless network device providing a WLAN. In step S504, when at least a wireless network device (referred to as the second wireless network device) providing a WLAN is found, the wireless network device 10 determines whether the service identifier of the found wireless network device includes a preset prefix. In step S506, when no wireless network device whose service identifier includes the preset prefix is found for the first waiting time (e.g. 30 seconds), the wireless network device 10 will repeat steps S502 to S506 until the first waiting time ends. In step S508, after the first waiting time ends, since no wireless network device found or the service identifier of the found wireless network device lacks the preset prefix, the operation mode of the wireless network device 10 changes from the client mode to the AP mode.

In step S510, the wireless network device 10 in the AP mode establishes a WLAN for other wireless network devices to connect to. In step S512, the wireless network device 10 receives a first setting signal carrying a terminal service identifier (e.g. a SSID of the network terminal device 22) from the communication device 20 (e.g. a smart phone). In step S516, the wireless network device 10 sends a second setting signal carrying the terminal service identifier to at least another wireless network device (referred to as the third wireless network device), e.g. the wireless network devices 17 and 19, connected to the wireless network device 10.

Before step S516 is performed, the wireless network device 10 further determines whether any other wireless network device links to the wireless network device 10. If not, the second setting signal is not sent. In another embodiment, the second setting signal is always sent without any determination.

In step S518, the operation mode of the wireless network device 10 changes from the AP mode to the client mode. In step S520, the wireless network device 10 edits its service identifier setting by the terminal service identifier to establish the connection between the wireless network device 10 and a network terminal device having the terminal service identifier (e.g. the network terminal device 22).

In step S522, the wireless network device 10 determines whether the number of found wireless network device whose service identifier includes the preset prefix is 1. In step S524, when the number of found wireless network device whose service identifier includes the preset prefix is 1, the connection between the wireless network device 10 and this wireless network device is established. In step S526, the wireless network device 10 receives the second setting signal carrying a terminal service identifier (e.g. a SSID of the network terminal device 22) from this wireless network device (e.g. a smart phone) to connect to the network terminal device (e.g. the network terminal device 22).

In step S528 shown in FIG. 5B, the number of wireless network device whose service identifier includes the preset prefix is not 1, the wireless network device 10 determines whether the number of wireless network device whose service identifier includes the preset prefix having a maximum dynamic value is 1. In step S532, if yes, the wireless network device 10 connects to this wireless network device with the maximum dynamic value. In step S534, the wireless network device 10 receives the second setting signal carrying a terminal service identifier from the wireless network device with the maximum dynamic value to connect to the network terminal device (e.g. the network terminal device 22).

Although not depicted in FIG. 5B, alternatively, in another embodiment, the wireless network device 10 can determine whether the number of wireless network device whose service identifier includes the preset prefix having a minimum dynamic value is 1 in step S528. The wireless network device 10 connects to the wireless network device with the minimum dynamic value in step S532 to receive the second setting signal carrying a terminal service identifier from this wireless network device in step S534 such that the wireless network device 10 can connect to the network terminal device (e.g. the network terminal device 22).

In step S544, if the number of wireless network device whose service identifier includes the preset prefix having a maximum dynamic value is not 1 (or alternatively if the number of wireless network device whose service identifier includes the preset prefix and having a minimum dynamic value is not 1), the wireless network device 10 connects to the wireless network device whose service identifier includes a minimum static name. In step S546, the wireless network device 10 receives the second setting signal carrying a terminal service identifier from the wireless network device with the minimum static name to connect to the network terminal device (e.g. the network terminal device 22).

Although not depicted in FIG. 5B, alternatively, in another embodiment, the wireless network device 10 can connect to the wireless network device whose service identifier includes a maximum static name in step S544 to receive the second setting signal carrying a terminal service identifier from this wireless network device in step S546 such that the wireless network device 10 can connect to the network terminal device (e.g. the network terminal device 22).

Referring to FIG. 5C, step S600 is equivalent to step S508 in FIG. 5A, and the rest of steps in FIG. 5C illustrates the steps between steps S510 and step S512 in FIG. 5A. In step S600, operate in the AP mode and enable a timer. In step S602, determine whether the number of other wireless network device connected to the wireless network device 10 is 0. If not, reset the timer and step S602 is repeated. Every two such determination tasks have a time interval therebetween. If yes, the wireless network device 10 determines whether the value of the timer is greater than a second waiting time in step S604. In step S606, when the number of other wireless network device connected to the wireless network device 10 is still 0 after the second waiting time, the operation mode of the wireless network device 10 will change from the AP mode to the client mode.

Notice that between steps S524 and S526, between steps S532 and S534, and between steps S544 and S546 (that is, after the wireless network device 10 connects to the wireless network device whose service identifier matches the above determination condition of service identifier and before the wireless network device 10 receives the second setting signal from such a wireless network device), the wireless network device 10 regularly or irregularly repeat the above searching task and the above determination of searching result, starting from step S502. If the wireless network device 10 finds out a wireless network device whose service identifier is more suitable, the wireless network device 10 will connect to the wireless network device whose service identifier is more suitable.

Please refer to FIG. 2 to FIG. 5C, an example scenario of the automatic configuration method is described as follows. After the wireless network device 10 is started, the wireless network device 10 initially operates in the client mode and searches for any second wireless network device providing a WLAN. When the wireless network device 13 is found, the wireless network device 10 will determine if the service identifier of the wireless network device 13 includes the preset prefix. If the service identifier of the wireless network device 13 lacks the preset prefix, the wireless network device 10 will continue searching for other second wireless network device providing a WLAN. When no second wireless network device whose service identifier includes the preset prefix is found in the first waiting time (e.g. 30 seconds) or when no second wireless network device is found in the first waiting time, the operation mode of the wireless network device 10 will change from the client mode to the AP mode to provide a WLAN such that other wireless network devices can connect to the wireless network device 10.

If subsequently the wireless network devices 17 and 19 are started, since the wireless network devices 17 and 19 found the wireless network device 10 whose service identifier includes the preset prefix, the wireless network devices 17 and 19 connect to the wireless network device 10.

Subsequently, a user use the communication device 20 (e.g. a smart phone) to communicate with the wireless network device 10 and send the first setting signal carrying the terminal service identifier of the network terminal device 22 to the wireless network device 10. After receiving the first setting signal, the wireless network device 10 sends the second setting signal carrying the terminal service identifier to the wireless network devices 17 and 19 linking with the wireless network device 10. After receiving the second setting signal, the wireless network devices 17 and 19 edit their service identifier setting by the terminal service identifier in the second setting signal and cut off the connection with the wireless network device 10.

Next, the wireless network devices 17 and 19 try to link to the network terminal device 22. After the connection between the wireless network device 10 and each wireless network device is cut off, the operation mode of the wireless network device 10 changes from the AP mode to the client mode and the wireless network device 10 edits its service identifier setting by the terminal service identifier to link to the network terminal device 22.

Besides, when the wireless network device 10 in the client mode finds out the wireless network devices 13 and 15 and the service identifiers of the wireless network devices 13 and 15 includes the preset prefix, the wireless network device 10 will determine whether the dynamic value of the service identifier of the wireless network device 13 is greater than that of the wireless network device 15. If the dynamic value of the service identifier of the wireless network device 13 is greater than that of the wireless network device 15, the wireless network device 10 will connect to the wireless network device 13. If the dynamic value of the service identifier of the wireless network device 13 is equal to that of the wireless network device 15, the wireless network device 10 further compares the static name of the service identifier of the wireless network device 13 with that of the wireless network device 15. If the ASCII of the static name of the service identifier of the wireless network device 13 is greater than that of the wireless network device 15, the wireless network device 10 connects to the wireless network device 15.

Then, after received the second setting signal from the wireless network device 15, the wireless network device 10 edits its service identifier setting by the terminal service identifier in the second setting signal and cuts off the connection with the wireless network device 15. Therefore, the wireless network device 10 connects to the network terminal device 22.

In the disclosure, a wireless network device can automatically switch its operation mode from the client mode to the AP mode or from the AP mode to the client mode, the service identifier of the wireless network device includes a preset prefix, the wireless network device receives a setting signal from a communication device, and the wireless network device transfers the content of the setting signal to other one or more wireless network devices in the same WLAN. In this way, a user can set the wireless network of only one wireless network device to carry out the wireless network setting of nearby wireless network devices. Moreover, when the wireless network device found more than one wireless network device with the preset prefix, the wireless network device can preferentially connect to one of the wireless network devices according to the dynamic values and static names of the service identifiers of these wireless network devices. Therefore, multiple wireless network devices can link to the same WLAN, whereby the user may more conveniently set the linking of these wireless network devices.

What is claimed is:

1. An automatic configuration method for linking a wireless local area network (WLAN), applied to set a first wireless network device and comprising:
    searching for at least a second wireless network device providing a WLAN exists;
    determining whether a service identifier of the found second wireless network device includes a preset prefix;
    when no second wireless network device is found or when the at least one second wireless network device is found and has the service identifier not comprising the preset prefix, setting the first wireless network device in an access point (AP) mode;
    when the number of found second wireless network devices whose service identifier comprises the preset prefix is one, a connection between the first wireless network device and the second wireless network device whose service identifier comprises the preset prefix is established;
    when the number of found second wireless network devices whose service identifier corn rises the preset prefix is not one, determining whether the number of found second wireless network device whose service identifier includes the preset prefix having a dynamic value is one, wherein the dynamic value is related to the number of the at least one third wireless network device connected to the first wireless network device;
    receiving a first setting signal comprising a terminal service identifier;
    sending a second setting signal from the first wireless network device to at least one third wireless network device connecting to the first wireless network device;
    setting the first wireless network device in a client mode;
    replacing the service identifier of the first wireless network device by the terminal service identifier; and
    establishing the connection between the first wireless network device and a network terminal device having the terminal service identifier.

2. The automatic configuration method according to claim 1, wherein when the number of the at least one third wireless network device connected to the first wireless network device increases, the dynamic value changes.

3. The automatic configuration method according to claim 2, wherein a fourth wireless network device exists, the service identifier of each of the second and fourth wireless network devices comprises the preset prefix and the dynamic value, and when the dynamic value of the service identifier of the second wireless network device is greater than that of the fourth wireless network device, the first wireless network device connects to the second wireless network device.

4. The automatic configuration method according to claim 3, wherein the service identifier of each of the second and fourth wireless network devices further comprises a static name, the static names of the service identifiers of the second and fourth wireless network devices are serial numbers respectively uniquely indicating the second and fourth wireless network devices, and when the dynamic values of the service identifiers of the second and fourth wireless network devices are the same, the automatic configuration method further comprises:
    comparing the static name of the service identifier of the second wireless network device with that of the fourth wireless network device to establish connection between the first wireless network device and one of the second and fourth wireless network devices.

5. The automatic configuration method according to claim 1, wherein an operation mode of the first wireless network device switches from the client mode to the AP mode in a first waiting time and switches from the AP mode to the client mode in a second waiting time.

6. The automatic configuration method according to claim 5, further comprising:
    when no second wireless network device connects to the first wireless network device for the second waiting time, switching the operation mode of the first wireless network device from the AP mode to the client mode to search for the second wireless network device.

7. The automatic configuration method according to claim 5, further comprising:
    when no second wireless network device exists for the first waiting time or when no second wireless network device whose service identifier having the preset prefix is found for the first waiting time, switching the operation mode of the first wireless network device from the client mode to the AP mode.

8. A wireless network device comprising a processing unit and a storage unit, wherein the storage unit is electrically connected to the processing unit and configured to store software instructions, and the processing unit is configured to perform the software instructions to perform the automatic configuration method of claim 1.

9. A wireless network device comprising a processing unit and a storage unit, wherein the storage unit is electrically connected to the processing unit and configured to store software instructions, and the processing unit is configured to perform the software instructions to perform the automatic configuration method of claim 2.

10. A wireless network device comprising a processing unit and a storage unit, wherein the storage unit is electrically connected to the processing unit and configured to store software instructions, and the processing unit is configured to perform the software instructions to perform the automatic configuration method of claim 3.

11. A wireless network device comprising a processing unit and a storage unit, wherein the storage unit is electrically connected to the processing unit and configured to store software instructions, and the processing unit is configured to perform the software instructions to perform the automatic configuration method of claim 4.

12. A wireless network device comprising a processing unit and a storage unit, wherein the storage unit is electrically connected to the processing unit and configured to store software instructions, and the processing unit is configured to perform the software instructions to perform the automatic configuration method of claim 5.

13. A wireless network device comprising a processing unit and a storage unit, wherein the storage unit is electrically connected to the processing unit and configured to store software instructions, and the processing unit is configured to perform the software instructions to perform the automatic configuration method of claim 6.

14. A wireless network device comprising a processing unit and a storage unit, wherein the storage unit is electrically connected to the processing unit and configured to store software instructions, and the processing unit is configured to perform the software instructions to perform the automatic configuration method of claim 7.

* * * * *